Figures 1, 2:
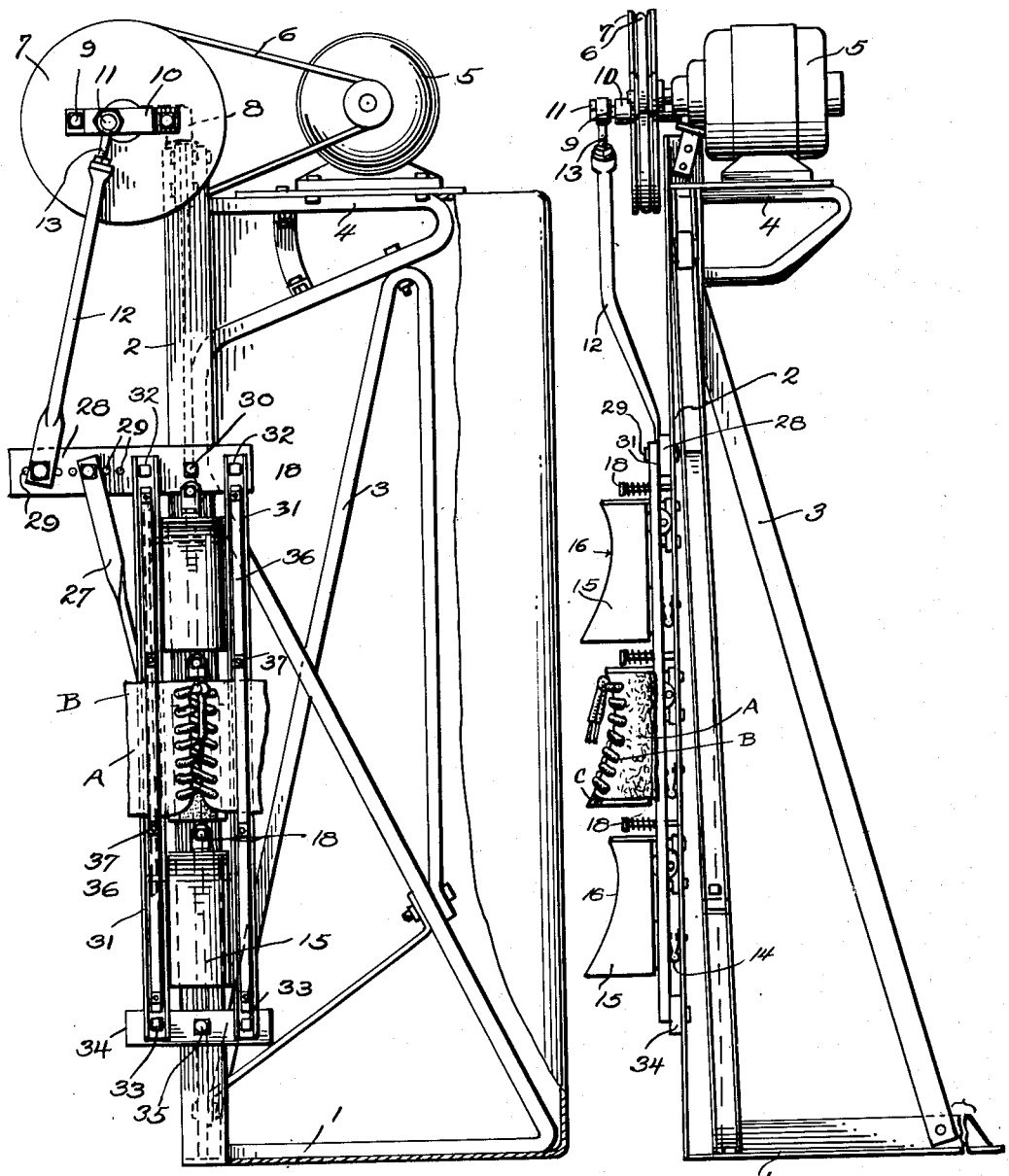

Nov. 4, 1952 A. A. AINES 2,616,286
SHOELACE TESTING MACHINE
Filed Aug. 4, 1947 2 SHEETS—SHEET 1

INVENTOR.
Andrew A. Aines
BY
V. J. Eccleston,
ATTORNEY

Nov. 4, 1952 — A. A. AINES — 2,616,286
SHOELACE TESTING MACHINE
Filed Aug. 4, 1947 — 2 SHEETS—SHEET 2
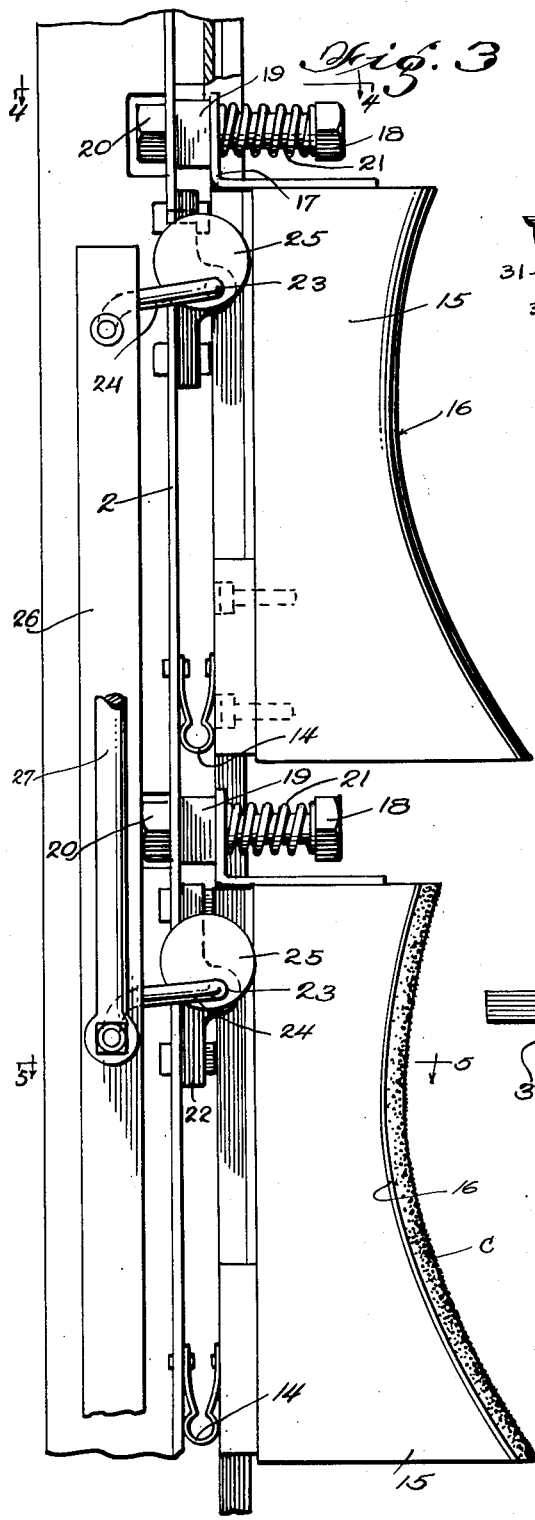
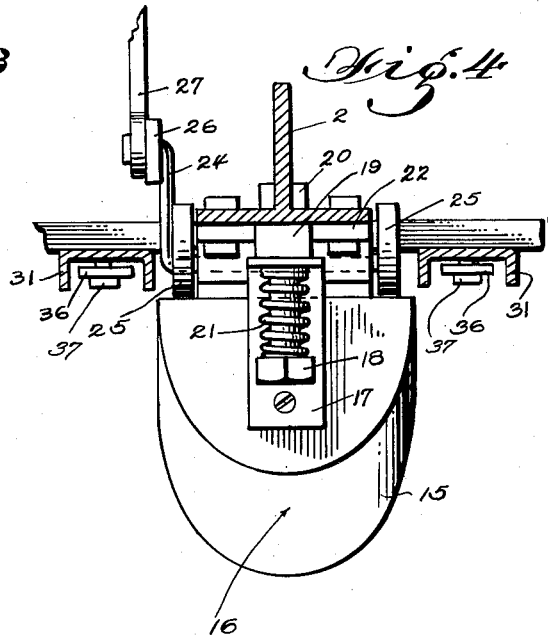
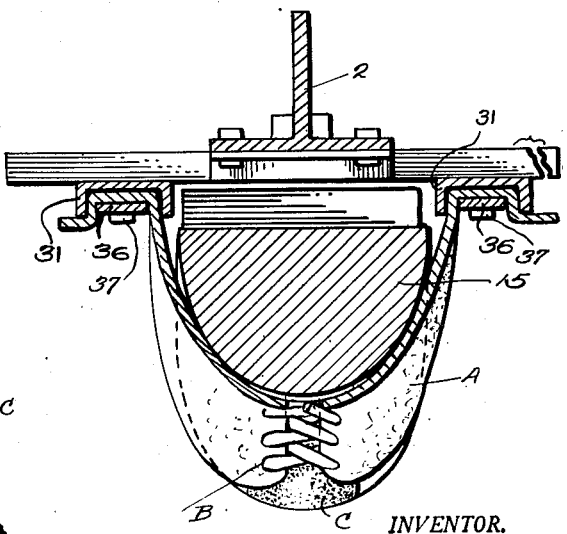
INVENTOR.
Andrew A. Aines
BY W. J. Eccleston,
ATTORNEY Patented Nov. 4, 1952

2,616,286

UNITED STATES PATENT OFFICE 2,616,286

SHOELACE TESTING MACHINE

Andrew A. Aines, Petersburg, Va.

Application August 4, 1947, Serial No. 766,121

7 Claims. (Cl. 73—7)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to testing apparatus and particularly to a mechanism for testing the wearability of shoelaces.

It is a primary object of the invention therefore to provide a mechanism on which laced shoestrings may be mounted and which will automatically transmit to the strings such stresses and strains as would occur while in actual use on a pair of shoes.

It is a further object of the invention to provide a mechanism which will subject shoelaces, in a matter of hours, to the amount of wear and tear usually requiring weeks or months of ordinary use.

Other objects and advantages of the invention will be in part apparent and in part pointed out in the following description taken in connection with the accompanying drawings, in which, Figure 1 is a front elevational view of the complete apparatus;

Figure 2 is a side elevational view;

Figure 3 is an enlarged elevational view of the mountings for the shoestrings and related parts; and Figures 4 and 5 are sectional views taken on lines 4—4 and 5—5 of Figure 3.

More specifically, the numeral 1 indicates the base of the testing apparatus which is provided with an upright column or pillar 2 which together form a frame for supporting in operative relationship the various mechanisms about to be described. The base 1 and pillar 2 are provided with a plurality of braces indicated generally by the numeral 3 for reinforcing the stand and for supporting a platform 4 adjacent the top of the column 2.

Mounted on the platform 4 is a motor 5 operatively connected by means of a belt 6 to a crank wheel 7 rotatably mounted on a bracket 8 secured on the upper end of the column 2. Fixed to one side of the wheel 7 as by means of bolts 9 is a block 10 provided with a journal 11 eccentrically disposed with respect to the center of the wheel 7. Connected to the journal 11 is a crank or pitman 12 provided with a threaded adjustment 13 for varying its length.

This pitman 12 is connected to and serves to operate the various mechanisms for subjecting shoelaces, in a brief period of time, to the amount of wear and tear usually requiring weeks or months of ordinary usage. Connected to the vertical standard 2 as by means of springs 14 are a plurality of blocks 15, three such blocks being shown in the present illustration. These blocks may be suitably concaved as indicated by numeral 16 in representation of that portion of a person's foot and ankle around which the upper part of a shoe is usually laced. The opposite or upper end of each of the blocks 15 is provided with a bracket 17 perforated to receive the shank portion of a bolt 18 which extends through the perforation and is fixed to the standard 2 by means of spacer sleeve 19 and nut 20. Interposed between the head of the bolt 18 and the bracket 17 is a compression spring 21 which serves to bias the upper end of each of the blocks 15 toward the standard 2. Rockably mounted on the standard 2 adjacent the upper end of each block 15 as by means of brackets 22 is a shaft 23 provided with a downwardly turned end 24. A pair of cams 25 is fixed to each shaft 23 and is maintained in contact with the under surface of the upper end of each block 15 by the action of the spring 21 against the bracket 17. Pivotally connected to the downturned end 24 of each of the shafts 23 is a bar 26 the reciprocation of which will cause the three pairs of cams 25 to operate in unison. A link 27 is pivotally connected at its lower end to the bar 26 and its upper end may be adjustably and pivotally connected to a lever 28 through the medium of a series of pin receiving openings 29 extending longitudinally of the lever. This lever is pivoted to the standard 2 by the connection 30 and is adapted to be oscillated back and forth about its pivot by the pitman 12 which is pivotally and adjustably connected to the outer end of the lever by means of the pin receiving openings 29 heretofore referred to. It will be understood, of course, that the extent of movement of the lever 28, the link 27, and the throw of the cams 25 will be varied in accordance with the adjustment of the pitman 12 and link 27 along the length of the lever 28.

The shoelaces to be tested may be laced and knotted in the conventional manner in strips of fabric A provided with the usual eyelets B such as are employed in the uppers of shoes of various types. These laced sections are to be stretched over the blocks 15 but prior to being so placed it is desirable to place a sheet of emery cloth or sandpaper on each of the blocks with its roughened surface extending outward, as indicated by the letter C in Figure 3. Thereafter the free edges of the laced members are fixedly secured to vertically extending rods or bars 31 of channel formation. These channel members are disposed on opposite sides of the blocks 15 and have their upper ends pivotally connected to the lever 28 on the opposite side of the pivot 30 as indicated by the numeral 32. The lower ends of the channel members or bars are pivotally connected as at 33 to a crossbar 34 which is in turn pivoted to the standard 2 as indicated by numeral 35. Clamping bars 36 extend approximately the full length of the channel members 31 and are adapted to be removably secured therein by suitably spaced bolts 37, and the free ends or edges of the flexible members A are secured in the channel bars by means of these clamping elements. By reason of the disposition of the pivots 32 of the members 31 on opposite sides of the pivot 30 of the lever 28 it will be readily apparent that the oscillation of the lever 28 will cause one member 31 to ascend while the other member 31 is descending thereby imparting a skewing action to the sheet A in simulation of the movement imparted to the laced uppers of shoes when in actual use.

In operation of the device the laces to be tested are threaded in conventional manner through the eyelets of flexible elements such as elements A shown on the drawings and knotted or clamped so as to maintain the laces in their laced condition. Thereafter these laced members are stretched over the concaved surfaces 16 of the blocks 15, with or without an intermediate sheet of emery cloth as hereinbefore mentioned, and are held in this stretched condition by means of the clamping bars 36 which are then fixed in the channel members 31 by means of bolts 37.

Thereafter the pitman 12 and connecting rod 27 may be adjusted along the lever 28 to the positions necessary to provide the desired throw of the cams 25, and the motor 5 is then set in operation. The belt 6 of the motor will rotate the crank disc 7 and due to the eccentric location of the journal 11 will impart a longitudinal reciprocating movement to the pitman 12 thereby oscillating the lever 28 about its pivot 30. This movement of the lever 30 will, through the operation of link 27 and the position of the pivots 32, cause the upper end of each of the blocks to be forced outwardly against the laced members A by reason of the action of the cams 25 against the upper ends of the blocks and will also cause the skewing action referred to above. These several stresses and strains applied to the laced fabric in the manner indicated will provide a very real simulation of the stresses and strains received by laced shoes in actual use and due to the rapid repetition of these movements it will be readily apparent that the amount of wear and tear produced will be equivalent to that to which a pair of laced shoes would be subjected over a period of weeks or months of ordinary wear.

While the structural features of this lace testing apparatus have been described in considerable detail, it is to be understood that various changes may be made in such structural details without departing from the essence of the invention and it is therefore intended that all such variations be included within the scope of the appended claims.

I claim:

1. Apparatus for testing shoestrings comprising a frame, a pair of parallel rods slidably mounted on the frame and across which a laced shoestring may be mounted, and means for reciprocating said rods simultaneously in opposite directions.

2. Apparatus for testing shoestrings comprising a frame, a block thereon, a reciprocably mounted rod on each side of the block, means for reciprocating said rods simultaneously in opposite directions, and means for securing a laced shoestring between said rods across said block.

3. Apparatus for testing shoestrings comprising a frame, a pivotally mounted block thereon, a reciprocably mounted rod on each side of the block, means for oscillating said block and reciprocating said rods simultaneously in opposite directions, and means for securing a laced shoestring between said rods and across said block.

4. Apparatus for testing shoestrings comprising a frame, a pivotally mounted block thereon, a cam cooperating with the block, a reciprocably mounted rod on each side of the block, a lever pivoted intermediate its ends and connected to said rods at points on opposite sides of its pivot, a link connecting said lever and cam, means for oscillating said lever, and means for securing a laced shoestring between said rods across said block.

5. In a testing apparatus for shoestrings, a frame, a block having one end pivoted to the frame, a cam for cooperation with the opposite end of the block, and means for securing a laced shoestring to the frame and stretched over the block.

6. In a testing apparatus for shoe strings, a frame, a block on the frame over which a laced shoestring may be stretched, a resilient mounting for one end of the block, a cam for cooperation with the opposite end of the block, and means for operating said cam.

7. In a testing apparatus for shoestrings, a frame, a block, means for resiliently connecting one end of the block to the frame, a cam for cooperation with the other end of the block, means for operating said cam, a spring for pressing the block against the cam, and means for securing a laced shoestring to the frame and stretched over the block.

ANDREW A. AINES.

REFERENCES CITED

The following references are of record in the file of this patent:

UNITED STATES PATENTS

| Number | Name | Date |
|---|---|---|
| 1,884,388 | Thwing | Oct. 25, 1932 |
| 2,013,643 | Bliss | Sept. 10, 1935 |
| 2,066,311 | Appel et al. | Jan. 5, 1937 |